Nov. 28, 1939.   V. H. WILSON   2,181,254
ARTIFICIAL MINNOW
Filed July 7, 1938
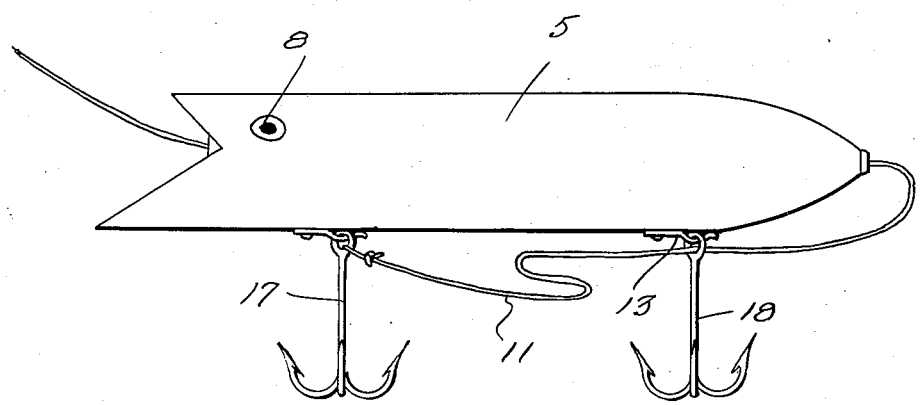
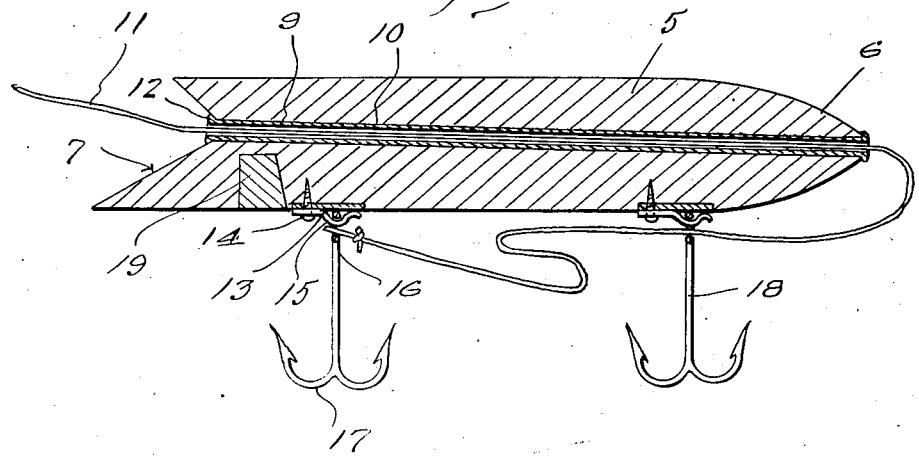
Inventor
V. H. Wilson
By Clarence A. O'Brien
and Hyman Berman
Attorneys Patented Nov. 28, 1939

2,181,254

UNITED STATES PATENT OFFICE 2,181,254

ARTIFICIAL MINNOW

Vernon H. Wilson, Olympia, Wash.

Application July 7, 1938, Serial No. 218,007

2 Claims. (Cl. 43—46)

The present invention relates to fish lures and has for its primary object to provide an article of this character in the form of an artificial minnow having the hook attached to the line and connected to the minnow by spring clips by means of which the hooks will become released from the minnow upon a fish striking the same whereby to prevent the utilization of the minnow for leverage purposes by the fish in a manner tending to cause the bending or breaking of the hook.

A further object is to provide an article of this character in which the lure is slidably positioned on the line and possessing sufficient buoyancy to cause the lure to slide upwardly along the line when released from the hook.

A still further object is to provide an article of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a side elevational view, and

Figure 2 is a longitudinal sectional view.

Referring now to the drawing in detail, the numeral 5 designates a fish lure in the form of a cylindrical plug which is tapered at one end as at 6 and formed with an inwardly extending substantially V-cut 7 at its opposite end in simulation of the jaws of a fish, the plug at its outer surface, immediately adjacent said notch 7 being provided with an imitation eye 8. The plug is formed with a longitudinally extending bore 9 within which a tubular guide 10 is fitted for receiving a fish-line 11, the ends of the guide being rolled as at 12 to remove any sharp cutting edges thereon.

The plug 5 is preferably formed of buoyant material, such as cork, wood or the like, and to its underside is secured a pair of metal plates 13 held in position by screws 14 and which also serve to secure one end of a spring clip 15 to each of the plates 13. The clips 15 preferably open in a direction toward the rear of the lure and are adapted to releasably receive the eyes 16 of fish-hooks 17. The line 11 is extended through the guide 10 from the front end of the plug to the rear end thereof, the line extending through the eye of the rear hook 18 and attached to the eye of the front hook 17 as will be apparent from an inspection of Figures 1 and 2 of the drawing.

If desired, the plug may be provided with a suitable weight 19 embedded in the underside thereof to enable the lure to be properly drawn through the water below the surface thereof.

In the operation of the device, as a fish strikes one of the hooks 17 or 18, the hooks will be released from the clips 13 enabling the plug 5 to slide upwardly along the line 11 and rise to the surface of the water, whereby to prevent the fish utilizing the plug as a leverage to bend or break the hook.

It is believed the details of construction and manner of operation of the device will be readily understood from the foregoing without further detailed explanation.

Having thus described the invention, what I claim is—

1. A fish lure comprising a buoyant plug having a longitudinal bore extending therethrough for freely receiving a fish line, a spring clip secured to the under side of the plug, said clip having an open end extending rearwardly, and a hook releasably carried by the clip and attached to said line, said hook being released when struck by a fish to free the plug for sliding movement on the line.

2. A fish lure comprising an elongated plug having a V-notch at one end simulating the jaws of a fish, a bore extending longitudinally of the plug, a tubular guide fitted in the bore having rolled ends preventing longitudinal movement of the guide in the plug and adapted to receive a fishline, a plurality of clips secured to the underside of the plug, said clips having open ends extending rearwardly, and fish hooks releasably secured to said clips and attached to the line, said hooks being released when struck by a fish to free the plug for sliding movement on the line.

VERNON H. WILSON.